United States Patent Office 3,181,939
Patented May 4, 1965

3,181,939
FUSED ALUMINA-ZIRCONIA ABRASIVES
Douglas W. Marshall, Niagara Falls, Ontario, and Steven J. Roschuk, Fonthill, Ontario, Canada, assignors to Norton Company, Worcester, Mass., a corporation of Massachusetts
No Drawing. Filed Jan. 27, 1961, Ser. No. 85,201
4 Claims. (Cl. 51—309)

This invention relates to electric furnace products. More particularly, this invention relates to abrasive materials of high strength.

Alpha-alumina, in the form known and referred to as fused alumina, has been used extensively as an abrasive material for many years. The reason for this extensive use is that alpha-alumina combines the properties of strength and hardness in such a way as to make it suitable for use in many different abrasive applications. The hardness of alpha-alumina is 9 on the Mohs' scale of hardness and the chemical formula is $Al_2O_3$. It has a density of 3.99 grams per cubic centimeter, is crystallized in the rhombohedral system and has a melting point of 2035° C. However fused alumina, partly because of its high purity, exhibits a degree of brittleness which deters from its complete acceptability as a snagging abrasive.

Zirconia, represented chemically by the formula $ZrO_2$, is not as hard as alpha-alumina, having a value of 6.5 on the Mohs' scale. Zirconia has a density of 5.56 grams per cubic centimeter and a melting point of 2690° C. However, zirconia is extremely durable and has been suggested for use in specific products where durability or wear resistance is especially desired. However, because of its relative abrasive softness, zirconia by itself is also unacceptable for processes which require strength and hardness.

It is therefore an object of this invention to provide an abrasive of high strength and hardness.

It is another object of this invention to provide such an abrasive also having a high degree of durability and wear resistance.

It is still another object of this invention to provide an abrasive material of high impact strength suitable for use in snagging operations.

It is a further object of this invention to provide a snagging abrasive that exhibits decreased wheel wear and increased material removal over snagging abrasives presently known.

Still further objects and the entire scope of applicability of the present invention will become apparent from the detailed description given hereinafter; it should be understood however, that the detailed description and specific examples, while indicating preferred embodiments of the invention, are given by way of illustration only, since various changes and modifications within the spirit and scope of the invention will become apparent to those skilled in the art from this detailed description.

It has been found that these objects may be attained by combining the desirable properties of fused alpha-alumina and zirconia. In this manner, an abrasive material is produced which combines the strength and hardness of alumina with the durability and wear resistance of zirconia and it has been found that this abrasive is especially suitable for snagging operations.

More particularly, it has been found that high purity alpha-alumina may be mixed with zirconia, also of high purity, in the proportions indicated hereinafter. The mixture is fused to a molten state in, for example, an arc tapping furnace and the fused product is quickly cooled. This rapid quenching may be achieved by pouring the product into an ingot mold, preferably of cast iron. The cooled cast product may then be crushed into grits suitable for making abrasive wheels.

A study of fused combinations of alumina and zirconia revealed that those having between about 90% alumina–10% zirconia and 40% alumina–60% zirconia are products which can be crushed into grits with extremely high impact strength and which are particularly outstanding as a snagging abrasive. The use of zirconia within this range results in an abrasive product having much greater impact strength and durability than fused aluminous abrasives now in use. The maximum improvement in impact strength is obtained with an amount of from about 15 to 30% zirconia in the product. Impact strengths somewhat lower are obtained with ranges of from 10 to 15% and 30 to 60% zirconia contents but these products are still considerably stronger than those of fused alpha-alumina.

Depending upon the relative proportions of alumina and zirconia, any composition thereof will be made up of one of the following:

(1) Zirconia crystals together with the low melting zirconia-alumina eutectic.
(2) The zirconia-alumina eutectic alone.
(3) Alumina crystals together with the low melting zirconia-alumina eutectic.

The zirconia-alumina eutectic, believed to be close to the theoretical 45% by weight level of zirconia, or about 40 mol percent thereof, consists of a uniform dispersion of extremely small zirconia particles in a matrix of alumina. The microstructure of the eutectic itself shows very little variation under widely varying cooling conditions, and whether or not a small or large excess of alumina or zirconia is present in the composition. The crystallinity of the excess alumina or zirconia, however, can be strongly affected by the rate of cooling. When the melt is cooled slowly the crystals of alumina or zirconia may grow to a considerable size, resulting in a segregation of the lower melting eutectic and a non uniform texture in the product.

Rapid quenching of melts containing an excess of alumina or zirconia over the eutectic composition results in very fine crystallization of the alumina or zirconia, the crystals generally being smaller than 300 microns. These crystals are generally separated from each other (or cemented together) by areas of the naturally fine eutectic. The overall microstructure is characterized by its uniformity and fine crystallinity. This leads to greatly improved strength in the abrasive grain produced from such product.

Alpha-alumina which may be successfully utilized in the process of this invention is preferably of high purity, usually at least 99.8% by weight $Al_2O_3$ and containing less than 0.1% sodium oxide. Another form of alumina which may be used is of a slightly lesser degree of purity and may contain up to as much as 0.4% sodium oxide. In this instance, about 0.5% carbon is included in the mix for the purpose of reducing the sodium oxide to less than 0.1% during the fusing procedure. The purity of zirconia is preferably at least about 99% $ZrO_2$.

As pointed out above, the fused mixture may be rapidly cooled by pouring into cast iron ingot molds. Attempts to duplicate the product by fusing the same mixture in other types of arc furnaces yielded products of lower grain strength. These experiments demonstrated that the high strengths obtained with these mixtures when poured into relatively small cast iron ingot molds are not obtained when the fused alumina-zirconia is cooled more slowly, for example, within the furnace. The following is a demonstration of differences in strengths obtained from rapidly quenched cast products and furnace cooled products, both of which were crushed into grits of a size to pass through 12 on 14 mesh.

Table I

|   | Percent ZrO₂ | K values Cast | K values Furnace cooled |
|---|---|---|---|
| 1 | 21.28 | .127 |  |
| 2 | 20.28 |  | 1.30 |
| 3 | 47.15 | .163 |  |
| 4 | 47.10 |  | .425 |
| 5 | 63.45 | .171 |  |
| 6 | 61.69 |  | 1.92 |

K is the measure of the amount of breakdown caused by impact. The value of K varies inversely with grain strength, being small for a strong grain and large for a weak grain.

The principal physical difference between the slowly cooled product and that rapidly quenched by casting into ingot molds is that the crystal sizes in terms of average diameter are about from 4 to 5 times larger in the furnace cooled product than those in the cast product. As pointed out above, it is the crystal size of the excess alumina or zirconia which is of chief concern since the alumina-zirconia eutectic essentially crystallizes as very fine crystals.

In this invention the effect of zirconia on the primary alpha-alumina phase of the product is not as important as its influence on the product as a whole. One of the most apparent effects that results from the addition of zirconia is the decrease in porosity of the product which is brought about by the presence of the low-melting eutectic which is trapped among the rapidly growing alumina crystals. Assuming that the eutectic contains the theoretical 40 mol percent zirconia, it may be calculated for every 1% by weight zirconia added, 2.2% by weight eutectic is formed. A relatively small amount of zirconia is sufficient to produce enough eutectic to completely fill the inter-granular voids to give a product essentially free from macropores. The resultant product, consisting of fine alumina crystals cemented together by the eutectic, yields a durable abrasive free of porosity. The addition of zirconia to alumina in the range of 10 to 60% and casting of the product into ingot molds leads to products of high grain strength (low impact K values) and reduced wheel wear properties during actual grinding.

In the following example, the conventional techniques of arc-furnace operation, well known in the art, are employed. Although the particular technique used in producing the melt is of no consequence so far as this invention is concerned, a detailed description of the conventional operation of the arc-tapping furnace is found in U.S. Patent 2,426,643 to Ridgway. A detailed description of the conventional operation of the batch arc furnace (Higgins furnace) is found in an article entitled "The Manufacture of Abrasives" by John A. Upper in the Journal of Chemical Education, December 1949, Number 12, pages 676 to 680. Insofar as the present invention is concerned, all that is necessary in the furnace is to produce a fusion of the specified ingredients.

EXAMPLE 1

A mixture of 800 pounds alpha-alumina containing 99.8% $Al_2O_3$ and 200 pounds of zirconia containing 99+% $ZrO_2$ was prepared and fused to a molten state in a 1000 pound arc tapping furnace. The fused product was immediately poured into a number of molds holding 25 pounds and 300 pounds of the mixture. Another batch was prepared and fused in a 1000 pound non-tapping furnace and after fusion, the product was conventionally cooled within the furnace. Each of the products from the molds and from the furnace was crushed into grits sized to pass through a 24 mesh on 28 mesh and analyzed for the crystal type present, the average crystal size and the proportion of single crystals in a sample of the through 24 on 28 mesh grit grain. The results are tabulated below, the proportion of single crystals in the 24 grit size particles being indicated as percent Mono:

|   | Crystal type | Crystal size (microns) | Percent mono |
|---|---|---|---|
| 25 lb. ingot | Dendritic | 50–150 | 4 |
| 300 lb. ingot | do | 150–300 | 10 |
| 1,000 lb. furnace cooled | do | 300–400 | 15 |

As pointed out above, the theory is that the alumina crystals are cemented together by the alumina-zirconia eutectic. In Example 1 in the case of the most rapid quenching (with the 25 pound ingot) the resultant alumina crystals are very small, hence facilitating more complete cementing action by the eutectic. As the alumina crystals grow larger (with the slower cooling in the 300 pound ingot and in the 1000 pound furnace), the cementing action is not as complete and hence a weaker grain is produced. This point is clearly illustrated by the impact test results included in Table I.

In addition, further work in the 1000 pound arc tapping furnace has disclosed that as the percent concentration of zirconia in the product increases to approach the eutectic composition (40 mol. percent, or 44.6 % by weight zirconia), the size of the ingot cast is not so critical.

Table II

| Type | K values 20% $ZrO_2$ | K values 30% $ZrO_2$ | K values 40% $ZrO_2$ |
|---|---|---|---|
| 25 lb. ingot | .144 | .150 | .164 |
| 50 lb. ingot | .183 | .184 | .180 |
| 300 lb. ingot | .353 | .258 | .196 |

As seen in the above table, the product containing 40% zirconia in the 300 pound ingot has a grain strength more nearly comparable to those of the products from the 25 pound and 50 pound ingots. Also, as the percent zirconia increases above the 44.6% eutectic composition, the grain strength again decreases. This, however, does not apply to the furnace cooled product where the grain strength remains very poor regardless of the product composition.

In addition to the high grain strength exhibited by products of this invention, the grits made into grinding wheels exhibit greatly improved grinding qualities over wheels prepared from grits of fused alpha-alumina. The following tables illustrate the impact strength and grinding characteristics from tests of a number of grinding wheels prepared from fused alumina-zirconia compositions as compared with those prepared from fused alpha-alumina.

In these tables, the ultimate superiority of the various wheels is indicated by the B.B. grinding quality. These values are related to wheel wear ($Ww$) and material removed ($Mr$) in the following manner:

$$\text{B.B. grinding quality} = \frac{(Mr)^2}{Ww}$$

A premium product would exhibit high material removal and low wheel wear properties and hence a high B.B. grinding quality. While it was indicated above that maximum impact strength is obtained in products having from 15 to 30% zirconia therein, results in the following tests illustrated that products having about 50% zirconia therein have the highest B.B. grinding quality and therefore exhibit overall grinding characteristics superior to all other products tests.

The fused alumina control wheels used in the tests were prepared from heat treated and mulled grain comprising 95% alpha-alumina. This is the highest strength fused aluminous abrasive produced by the Norton Company of Worcester, Massachusetts. In the first test, bonded wheels were prepared having a size of 16 x 2 x 1 inch. The workpiece was of stainless steel and measured 18 x 8 inches. Two 15-minute runs per wheel were conducted under a grinding pressure of 400 pounds and a speed of 9500 surface feet per minute. The results of this test are indicated in Table III.

In the final test, wheels were prepared having a size of 16 x 2 x 6 inches. Two 15-minute runs per wheel were conducted on a 16 inch remote-controlled swing-frame grinder. The grinding speed was 9500 surface feet per minute under 400 pounds pressure on a stainless steel surface measuring 6 x 24 inches.

*Table V*

| Product | WCF | FW | Wheel wear, $Ww$ | Material removed, $Mr$ | B.B. grinding quality | Total gross power, KW |
|---|---|---|---|---|---|---|
| Fused aluminous abrasive (95% alpha-alumina) | 135 | 3.17 | 76 | 105 | 144 | 14.0 |
|  | 135 | 3.17 | 84 | 105 | 132 | 13.8 |
| Alumina-zirconia (20% $ZrO_2$), 25 lb. ingot | 146 | 3.36 | 48 | 87 | 158 | 12.8 |
|  | 146 | 3.37 | 50 | 87 | 152 | 12.8 |
| Alumina-zirconia (50% $ZrO_2$), 25 lb. ingot | 154 | 3.59 | 64 | 119 | 220 | 15.4 |
|  | 154 | 3.61 | 54 | 113 | 236 | 13.4 |

WCF=Weight per cubic foot (pounds).
FW=Fired weight of finished wheel (pounds).
$Ww$=Cubic inches per hour.
$Mr$=Pounds per hour.

*Table III*

| Product | K value, 12 on 14 grit | | Wheel wear, $Ww$ | Material removed, $Mr$ | B.B. grinding quality |
|---|---|---|---|---|---|
|  | Unmulled | Mulled | | | |
| Fused aluminous abrasive (95% alpha-alumina) |  | ¹ 200 | 120 | 117 | 114 |
| Cast alumina-zirconia ² (19.11% $ZrO_2$) | .133 | .061 | 64 | 108 | 182 |

¹ Mulled to a density of 130 lb./cu.ft.
² Grinding test performed on unmulled grain.
$Ww$=cubic inches per hour.
$Mr$=pounds per hour.

In the second series of tests, bonded wheels were prepared having a size of 8 x ¾ x 1 inch. The test consisted of a 30-minute grinding time per wheel on an 8 inch swing-frame grinder. Grinding speed was 9500 surface feet per minute with 85 pounds pressure on a stainless steel surface measuring 6 x 12 inches. Wheel wear was measured after each 30-minute period and material removal was measured after each 15-minute period. The results of these tests are given in Table IV wherein values are given for two separate grinding runs together with the average value for each product.

What is claimed is:
1. A fused abrasive material consisting essentially of a mixture of alpha-alumina and zirconia and containing less than 0.1% soda, said zirconia being present in an amount from about 10 to 60% by weight of said mixture, said mixture consisting of portions (a) and (b), portion (a) of said abrasive material being an alumina-zirconia eutectic and portion (b) being crystals of a member selected from the group consisting of alpha-alumina and zirconia, said crystals having an average size not greater than 300 microns, said abrasive material having a high impact strength whereby it is suitable for snagging stainless steel.

2. The abrasive material according to claim 1 wherein the average size of said crystals is between 50 and 150 microns.

3. The abrasive material according to claim 1 wherein the material is an alumina-zirconia eutectic having alpha-alumina crystals therein.

4. The abrasive material according to claim 1 whereing the material is an alumina-zirconia eutectic having zirconia crystals therein.

(References on following page)

*Table IV*

| Product | K value, 12 on 14 grit | Wheel wear, $Ww$ | Material removed, $Mr$ | B.B. grinding quality | Total gross power, KW |
|---|---|---|---|---|---|
| Fused aluminous abrasive (95% alpha-alumina) | (Mulled) | 6.4 | 13.8 | 30 | 4.46 |
|  |  | 6.7 | 14.7 | 32 | 4.88 |
|  |  | 6.6 | 14.3 | 31 | 4.67 |
| Alumina-zirconia (2.03% $ZrO_2$) | 0.372 (unmulled) | 12.4 | 12.6 | 13 | 4.58 |
|  |  | 13.0 | 13.8 | 15 | 4.64 |
|  |  | 12.7 | 13.2 | 14 | 4.61 |
| Alumina-zirconia (15.16% $ZrO_2$) | 0.168 (unmulled) | 4.4 | 10.4 | 25 | 3.98 |
|  |  | 3.8 | 9.2 | 22 | 3.74 |
|  |  | 4.1 | 9.8 | 24 | 3.86 |
| Alumina-zirconia (51.86% $ZrO_2$) | 0.167 (unmulled) | 4.1 | 14.0 | 48 | 4.58 |
|  |  | 3.9 | 12.4 | 39 | 4.56 |
|  |  | 4.0 | 13.2 | 44 | 4.57 |
| Alumina-zirconia (86.48% $ZrO_2$) | 0.401 (unmulled) | 12.3 | 9.6 | 7.5 | 4.12 |
|  |  | 11.4 | 8.9 | 7.0 | 4.26 |
|  |  | 11.9 | 9.3 | 7.3 | 4.17 |

$Ww$=cubic inches per hour.
$Mr$=pounds per hour.

References Cited by the Examiner

UNITED STATES PATENTS

| | | | |
|---|---|---|---|
| 1,240,490 | 9/17 | Saunders et al. | 51—309.1 |
| 2,769,699 | 11/56 | Polch | 51—298 |
| 2,842,447 | 7/58 | Schlotzhauer et al. | 106—57 |
| 2,877,105 | 3/59 | Smith | 51—308 |
| 2,903,373 | 9/59 | Sandmeyer | 106—57 |
| 2,934,416 | 4/60 | Harris et al. | 51—309 |
| 2,919,994 | 1/60 | Steimke | 106—65 |
| 3,025,175 | 3/62 | Aldred | 106—57 |
| 3,079,452 | 2/63 | Chopin | 106—57 |
| 3,106,452 | 10/63 | Watson et al. | 23—142 |

ALEXANDER H. BRODMERKEL, *Primary Examiner.*

JOSEPH REBOLD, LESLIE H. GASTON, MORRIS LIEBMAN, *Examiners.*